US007835530B2

(12) United States Patent
Avigni

(10) Patent No.: US 7,835,530 B2
(45) Date of Patent: Nov. 16, 2010

(54) SYSTEMS AND METHODS FOR DETERMINING SOUND OF A MOVING OBJECT

(76) Inventor: Cristiano Avigni, 1090A Manhattan Ave., Brooklyn, NY (US) 11222

( * ) Notice: Subject to any disclaimer, the term of this patent is extended or adjusted under 35 U.S.C. 154(b) by 1511 days.

(21) Appl. No.: 10/301,166

(22) Filed: Nov. 21, 2002

(65) Prior Publication Data

US 2003/0142829 A1 Jul. 31, 2003

Related U.S. Application Data

(60) Provisional application No. 60/333,678, filed on Nov. 26, 2001.

(51) Int. Cl.
*H04B 3/00* (2006.01)

(52) U.S. Cl. ............................ 381/77; 381/92; 381/86; 455/457; 340/426.17

(58) Field of Classification Search .................. 381/26, 381/104–109, 99, 100, 91–92, 122, 111–115, 381/77, 79, 82, 86, 56, 102; 455/88, 92, 455/68, 352, 343.2, 345, 95, 457, 500; 340/426.17, 340/573.1, 441, 457; 348/148–149, 14.01, 348/14.09, 14.05
See application file for complete search history.

(56) References Cited

U.S. PATENT DOCUMENTS

| | | | | |
|---|---|---|---|---|
| 4,381,488 | A * | 4/1983 | Fricke et al. | 333/14 |
| 4,396,806 | A * | 8/1983 | Anderson | 381/103 |
| 4,853,963 | A * | 8/1989 | Bloy et al. | 704/225 |
| 5,488,668 | A * | 1/1996 | Waldhauer | 381/320 |
| 5,724,433 | A * | 3/1998 | Engebretson et al. | 381/106 |
| 5,865,624 | A * | 2/1999 | Hayashigawa | 434/66 |
| 6,588,022 | B1 * | 7/2003 | Anders et al. | 2/421 |
| 6,614,911 | B1 * | 9/2003 | Watson et al. | 381/86 |
| 6,885,752 | B1 * | 4/2005 | Chabries et al. | 381/321 |
| 6,940,987 | B2 * | 9/2005 | Claesson | 381/107 |
| 7,119,832 | B2 * | 10/2006 | Blanco et al. | 348/148 |
| 2002/0115454 | A1 * | 8/2002 | Hardacker | 455/457 |
| 2003/0016834 | A1 * | 1/2003 | Blanco et al. | 381/91 |

FOREIGN PATENT DOCUMENTS

WO WO 95/35012 * 12/1995

* cited by examiner

*Primary Examiner*—Vivian Chin
*Assistant Examiner*—Lun-See Lao
(74) *Attorney, Agent, or Firm*—Lathrop & Gage LLP

(57) ABSTRACT

A system for the capturing and relay of sounds from a moving object is described. A plurality of microphone units are positioned at various locations on the moving object to capture sounds. Signals are generated based on captured sounds and transmitted from the moving object to a central receiving station. The central receiving station then takes the signals received and processes such signals for transmission to a communications network for broadcasting the sounds to an audience.

30 Claims, 12 Drawing Sheets

SYSTEMS AND METHODS FOR DETERMINING SOUND OF A MOVING OBJECT

RELATED APPLICATIONS

This application claims priority to U.S. provisional application serial No. 60/333,678, filed Nov. 26, 2001, entitled "SOUND OF SPEED REMOTE DELIVERY SYSTEM" and which is incorporated herein by reference.

BACKGROUND

A moving object generates sound. From the perspective of the moving object, externally generated sound is different from that the sound the object would hear if it was motionless. There is the need to know and better appreciate these sounds.

In the prior art, devices do exist for relaying sound from a moving object; but such devices do not accurately reproduce the sound. Accordingly, the vast majority of persons have little or no appreciation of the sounds of moving objects. By way of example, in car racing, a single microphone may be used to communicate voice data between the driver and the rest of the team. However, such a microphone device does not deliver high fidelity sound; it also does not correctly portray the sounds of or around the car. Accordingly, audiences and others cannot appreciate actual sounds associated with the racecar and/or driver.

The afore-mentioned problem exists in sporting and other activities. That is, heretofore, there is no technique to acquire and relay actual sounds to others and relating to a moving object.

SUMMARY

In one aspect, a system provides for determining sound of a moving object by capturing and relaying sound therefrom. This sound may be "surround sound" so that a highly accurate reproduction of that sound may occur. The system has a plurality of microphone units; typically, four, five, or more microphone units are provided. Each microphone unit captures sound and generates signals representative of that sound. Each microphone unit may include a microphone, a battery and a microprocessor and/or other logic to accomplish the functions of the microphone unit. The sound signals may be communicated to one or more transmission units for wirelessly transmitting such signals to locations remote from the moving object.

In another aspect, the one or more transmission units are located on the moving object remote from the microphone units. The one or more transmission units may include one or more transmitters connected with an antenna to wirelessly communicate captured sound data to locations remote from the moving object.

In yet another aspect, wireless transmission of signals indicative of sounds captured by the microphone units may be by radio-frequency (RF) transmitters, telephones (e.g., cellular), or other wireless communicative means.

The microphone units may be attached to various locations on the moving object. By way of example, for a racecar, a microphone unit may be placed at each of four extremities of the racecar. (e.g., one for each comer, or one for each suitable location near to a wheel of the racecar). A fifth microphone unit may be co-located with a subjective point, such as with an ear of a driver of the racecar. According to one aspect, the one or more transmission units may be located on the moving object at a point to maximize the effective transmission of a wireless signal away from the moving object.

Those skilled in the art should appreciate that the system for determining sound of a moving object may apply to other sports and activity. By way of example, a plurality of units may attach with a canoe and another unit may attach to the canoeist's ear. A similar arrangement may occur in skiing or in other activity. The system may of course operate with or without an "ear" unit.

In another aspect, the microphone units are constructed and arranged to directionally capture sound. By way of example, using the racecar example, each of the four microphone units may capture sound at 90 degrees from the car's forward motion. Additionally, the fifth microphone unit may be omni-directional in nature, so that it captures sound from many directions and without directional preference. Alternatively, all five microphone units may be omni-directional in nature.

Still another feature of the system relates to transmitting data from the transmission units to a central receiving station for processing. The central receiving station may be a parametric electronics device that mixes the signals (e.g., the five signals from the microphone units in the race car example) and then broadcasts information to, for example, a television station that will air details about the captured sound. The television station may replay the sound, based on the information, so that an audience can hear and appreciate the full sound of the racecar. The information may also be processed to analyze certain characteristics of the sound.

Signals transmitted from the transmission units to the central receiving station may, in one aspect, travel directly therebetween, or alternatively may travel along relay antennas in order to boost the signal strength such that sufficiently strong signals reach the central receiving station, or such as to relay data long distances.

In another aspect, the central receiving station may perform certain other functions on received signals from the microphone units, including compressing and encoding such signals. These functions may include adjustable parameters that make the system more portable between several activities, e.g., car racing and boating.

According to another aspect, the one or more transmission units may further have one or more encoders. The encoders of the transmission units convert the signals generated by the transmitters to digital signals for wireless transmission.

In yet another aspect, the one or more transmission units may further have a processor. The processor receives the signals from the microphone units, preamplifies the signals, converts the signals from analog to digital signals and then encodes the signals into a digital stream for transmission by a transmitter through antenna to wirelessly communicate captured sound data.

Each of the microphone units may be mounted within a recessed area of the moving object. The recessed areas may be, for example, located on the front and rear aerodynamic wings of the racecar, and may serve to at least partially shield the microphone units from the direct airflow over the car. The shielding reduces unwanted sounds generated by the microphone units when directly encountering high-speed airflow, so that "pure" sounds are captured from the moving object.

DETAILED DESCRIPTION OF THE INVENTION

Figure 1:
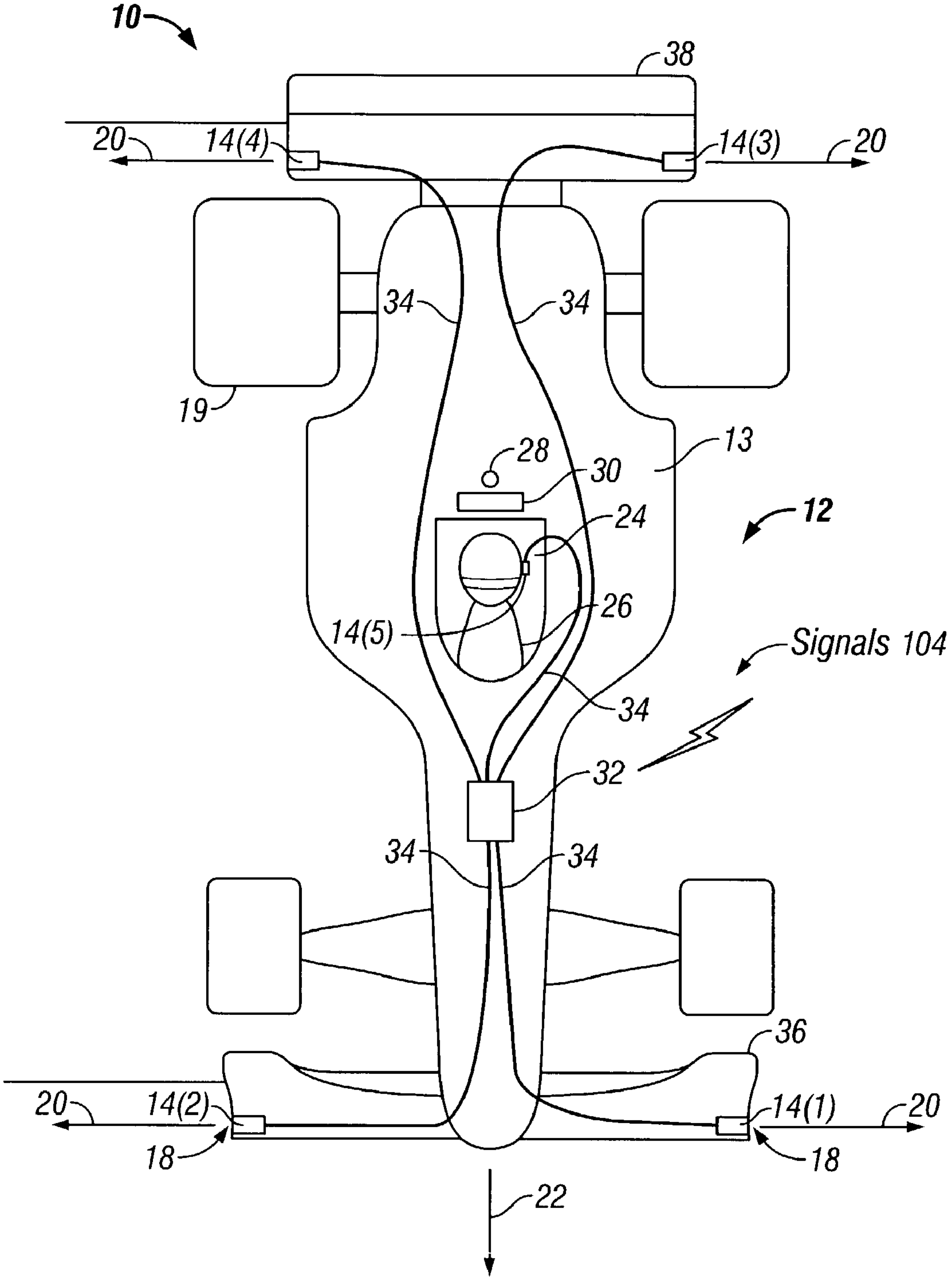
FIG. 1 shows a system for determining sound, and in use with a racecar.

FIG. 1 shows a system 10 for determining sound of a moving object, and in use with a racecar 12. System 10 has a plurality of microphone units 14(1)-14(5). Microphone units 14(1)-14(4) may be located at four extremities of car 12, such as near opposite lateral ends of front and rear aerodynamic wings 36, 38, to capture varying sounds encountered by different regions of car 12. However, there may be any number of microphone units 14 positioned on car 12, such as five or more. Each microphone unit 14(1)-14(4) may capture sound at a direction 20 that is perpendicular to forward motion 22 of car 12. Microphone unit 14(5), on the other hand, may captures omni-directional sound; microphone unit 14(5) may for example reside with a helmet 24 of a driver 26 of car 12. Alternatively, all or any number of microphone units 14(1)-14(5) may be omni-directional in nature.

Figure 4A:
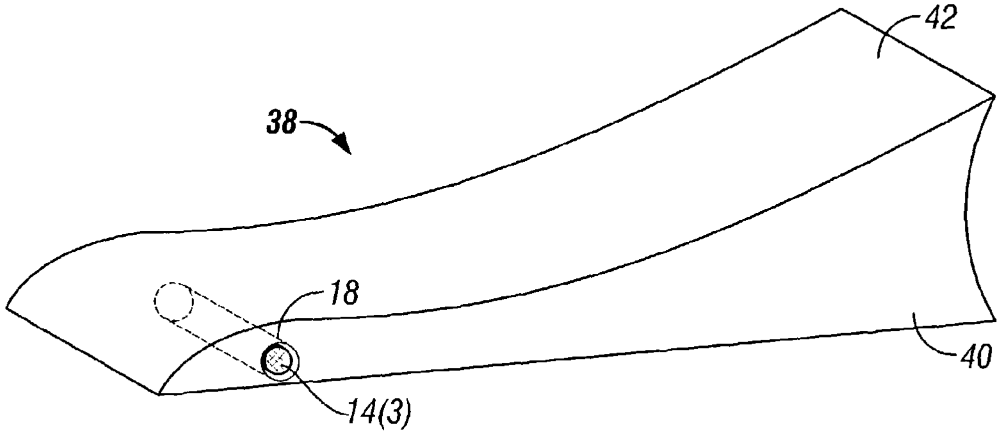
FIG. 4A shows a broken perspective view of an aerodynamic wing of the racecar with one microphone unit mounted therein.
Figure 4B:
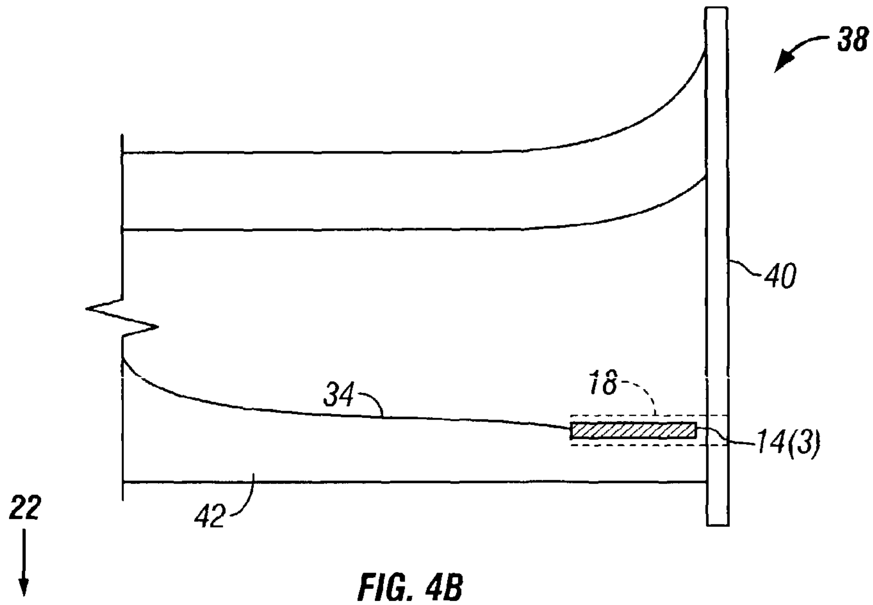
FIG. 4B shows a broken top view of the aerodynamic wing of FIG. 4A with the microphone unit and associated wiring.

Each microphone unit 14 is preferably mounted within a recessed area, such as a hosting bore 18 as shown in FIG. 4A and FIG. 4B. Microphone unit 14(5) may also be mounted near a centerpoint 28 of car 12. Optionally, system 10 includes a camera 30 to capture pictures and/or video from racecar 12. Each of the microphone units 14(1)-14(5) generates a signal based on the sound captured and preferably communicates such signal to a transmission station 32. One transmission station 32 may be provided for each microphone unit 14(1)-14(5), but preferably microphone units 14(1)-14(5) all communicate signals to a single transmission station 32. Transmission station 32 transmits a wireless signal 104 containing information about the captured sounds to a location remote from car 12. Transmission station 32 may be mounted onto a shell 13 of car 12, or mounted in a cavity formed within shell 13 of car 12. Camera 30 may transmit captured images directly to a remote location, or may likewise communicate signals to transmission station 32 to be transmitted along with the sound signals to the remote location. Each microphone unit 14, and optionally camera 30, may communicate sound or picture/video signals along hard wiring 34 to transmission station 32; however, units 14(1)-14(5) and camera 30 may each be provided with a wireless transmitter for communicating such signals to transmission station 32. Hard wiring 34 may be any type of wiring or cabling for transporting communications signals.

Each of the microphone units 14(1)-14(5) capture sounds at locations such as those shown in FIG. 1. However, those skilled in the art should appreciate that microphone units 14 may be placed at other locations. For example, microphone units 14(1)-14(4) may be placed at locations near to wheels 19 of car 12, or at some other location such that sounds that would be encountered by varying regions of car 12 are captured.

Figure 2:
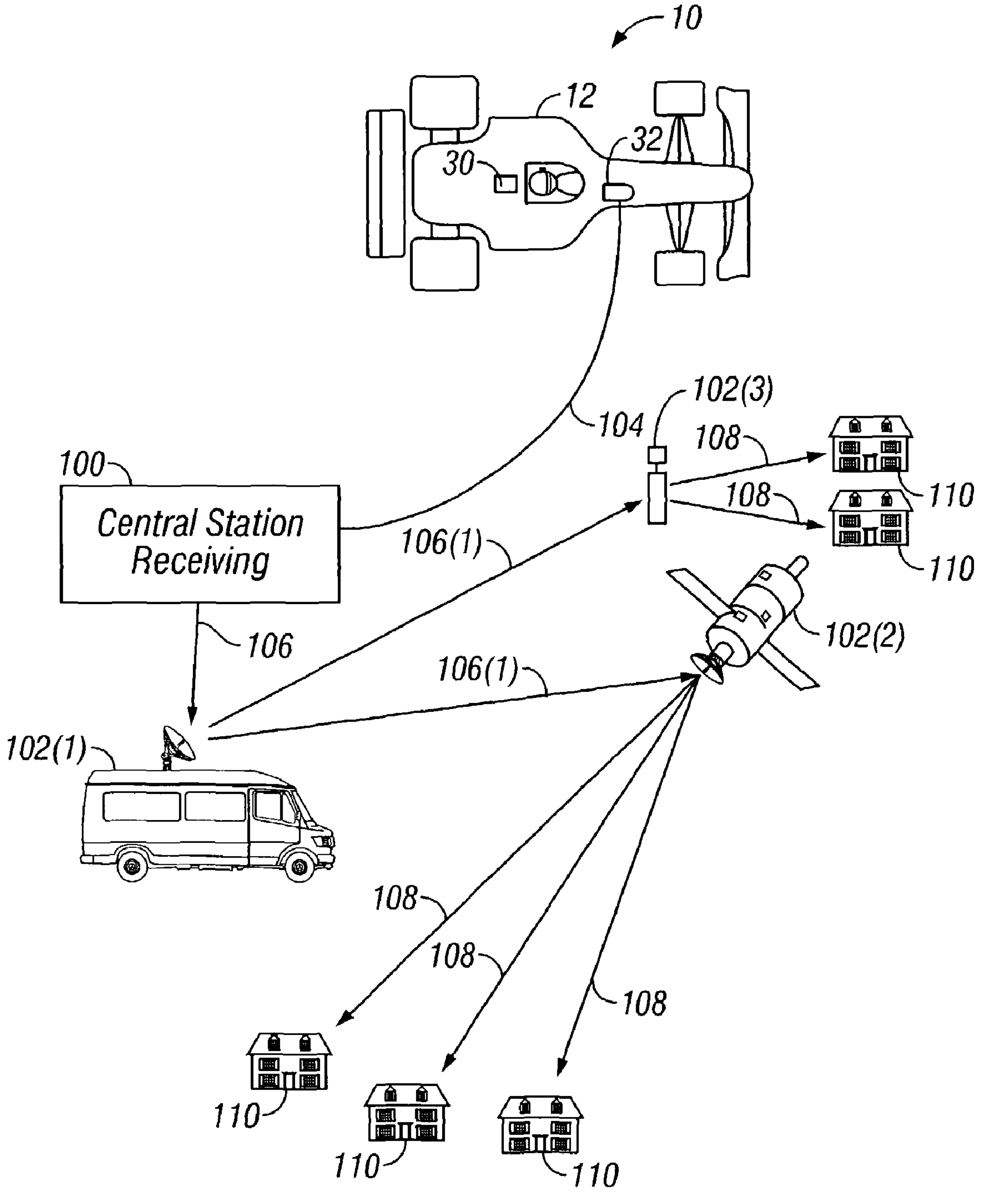
FIG. 2 shows a diagram of the system of FIG. 1 coupled with one central receiving station and television network.

FIG. 2 shows system 10, FIG. 1, coupled with a central receiving station 100 and television network 102. Central receiving station 100 may processes wireless signals 104 generated from transmission station 32 representative of sound captured by microphone units 14(1)-14(5), as well as picture/video signals from camera 30, and may send a signal 106 to network 102. Network 102 may for example include a television truck 102(1) that is local to the race, to receive signal 106, and a satellite 102(2) or ground-based antenna network 102(3) that receives signal 106(1) from truck 102(1). Signal 106(1) may for example include audio and video signals from microphone units 14(1)-14(5) and camera 30. Satellite 102(2) or ground-based antenna network 102(3) may then send broadcast signals 108 to various homes 110 of an audience or television viewers, who may then enjoy the information provided in signal 106(1).

It should also be understood that television network 102 may alternatively be, for example, a radio network for broadcastings the audio signals over radio frequencies. Both television and radio network signals may also be broadcast over the internet or other communications network.

Figure 3:
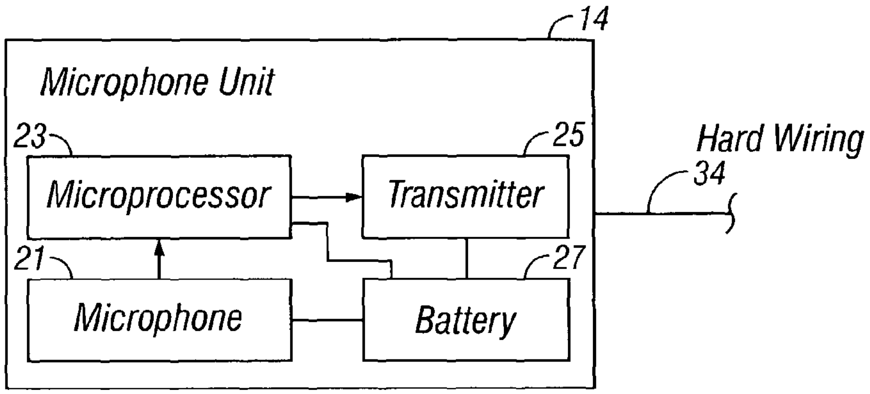
FIG. 3 shows a schematic block diagram of one microphone unit.

FIG. 3 schematically shows the components of one exemplary microphone unit 14, such as one of units 14(1)-14(5) of FIG. 1. Microphone unit 14 may have a microphone 21 for capturing sound, a microprocessor 23 for converting captured sound into digital information, a transmitter 25 or bus driver for communicating the digital information, either wirelessly or along hard wiring 34, to transmission station 32, and a battery 27 for providing power for the various components of microphone unit 14. Alternatively, hard wiring 34 may provide power to microphone unit 14 such that battery 27 is not needed in microphone unit 14. In another embodiment, signals communicated along hard wiring 34 from microphone unit 14 to transmission station 32 are analog signals generated by microphone 21, such that microprocessor 23 and transmitter 25 are not needed in microphone unit 14.

FIG. 4A and FIG. 4B show how microphone units 14(1)-14(4) are preferably mounted to racecar 12. Hosting bores 18 extend laterally inward from the sidewalls 40 of front and rear aerodynamic wings 36, 38 and are sized and configured to house microphone units 14(1)-14(4) therein such that the units are not exposed to direct airflow traveling over car 12 and thus face outwardly and perpendicular to forward motion 22 of car 12 (i.e., direction 20, FIG. 1). Microphone units 14(1)-14(4) may be secured within hosting bores 18 by various techniques, such as magnets, adhesives or brackets and mechanical fasteners (e.g., screws). Hosting bores 18 may be disposed at a variety of vertical and longitudinal positions along sidewalls 40 of aerodynamic wings 36, 38 as a matter of design choice, to capture sounds from desired locations. If microphone unit 14(5) for capturing omni-direction sound is not located on driver 26 (e.g., with helmet 24), a vertically extending hosting bore (not shown) may be disposed at, for example, centerpoint 28 of the car 12 for microphone unit 14(5). Hard wiring 34 may extend inside aerodynamic wings 36, 38 and/or inside shell 13 of the car 12 from hosting bores 18 to transmission station 32. Alternatively, hard wiring 34 may be secured to an outer surface 42 of the wings 36, 38 and shell 13 of car 12 by various techniques similar to that used to secure microphone units 14(1)-14(4), such as magnets, adhesives or brackets and mechanical fasteners (e.g., screws).

Figure 5:
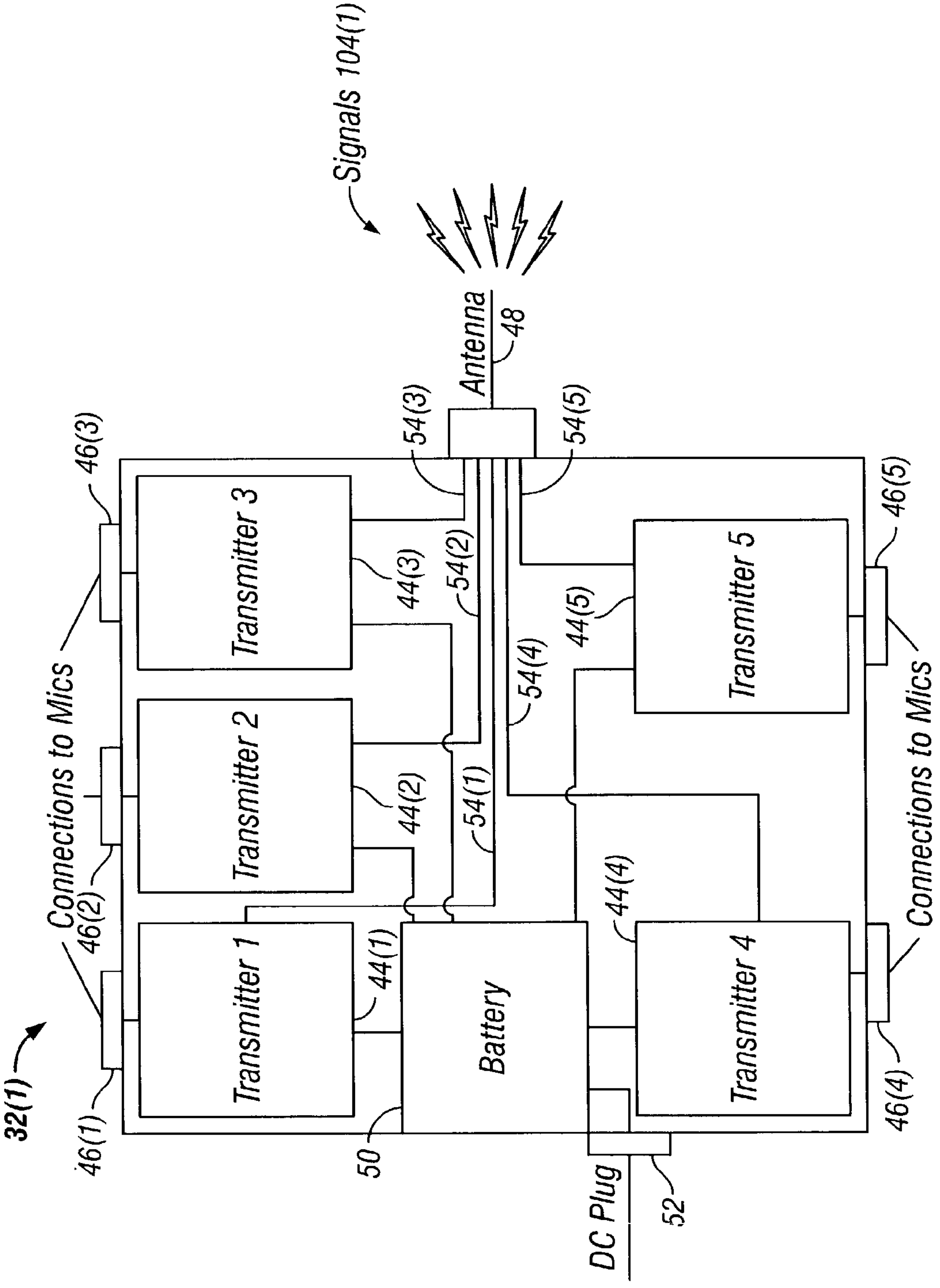
FIG. 5 is a schematic diagram of one transmission station having a plurality of transmitters.

FIG. 5 shows one representative transmission station 32(1) suitable for use in system 10. Transmission station 32(1) has a number of transmitters 44(1)-44(5), preferably one for each of microphone units 14(1)-14(5), to transmit the signals generated by microphone units 14(1)-14(5) to central receiving station 100. Transmitters 44(1)-44(5) may convert the five output signals of microphone units 14(1)-14(5) to five radio-frequency (RF) signals 54(1)-54(5) for transmission to central receiving station 100. A number of connectors 46(1)-46(5) may be configured to interface with electrical wiring 34 from microphone units 14(1)-14(5) to communicate signals generated by microphone units 14(1)-14(5) to transmitters 44(1)-44(5). Transmitters 44(1)-44(5) are in electrical communication with an antenna 48 that relays wireless signals 104(1) to central receiving station 100. A power source, such as a battery 50, provides electrical power to transmitters 44(1)-44(5), and may be recharged through a DC plug 52. DC plug 52 may have a power inverter such that AC electrical power may be supplied through a standard electrical outlet of a buildings etc. Alternatively, battery 50 may be a battery powering the overall operation of car 12 such that a separate battery is unnecessary in transmission station 32(1). A transmitter may also be supplied with camera 30, or may reside with transmitters 44(1)-44(5) within transmission station 32(1).

Figure 6:
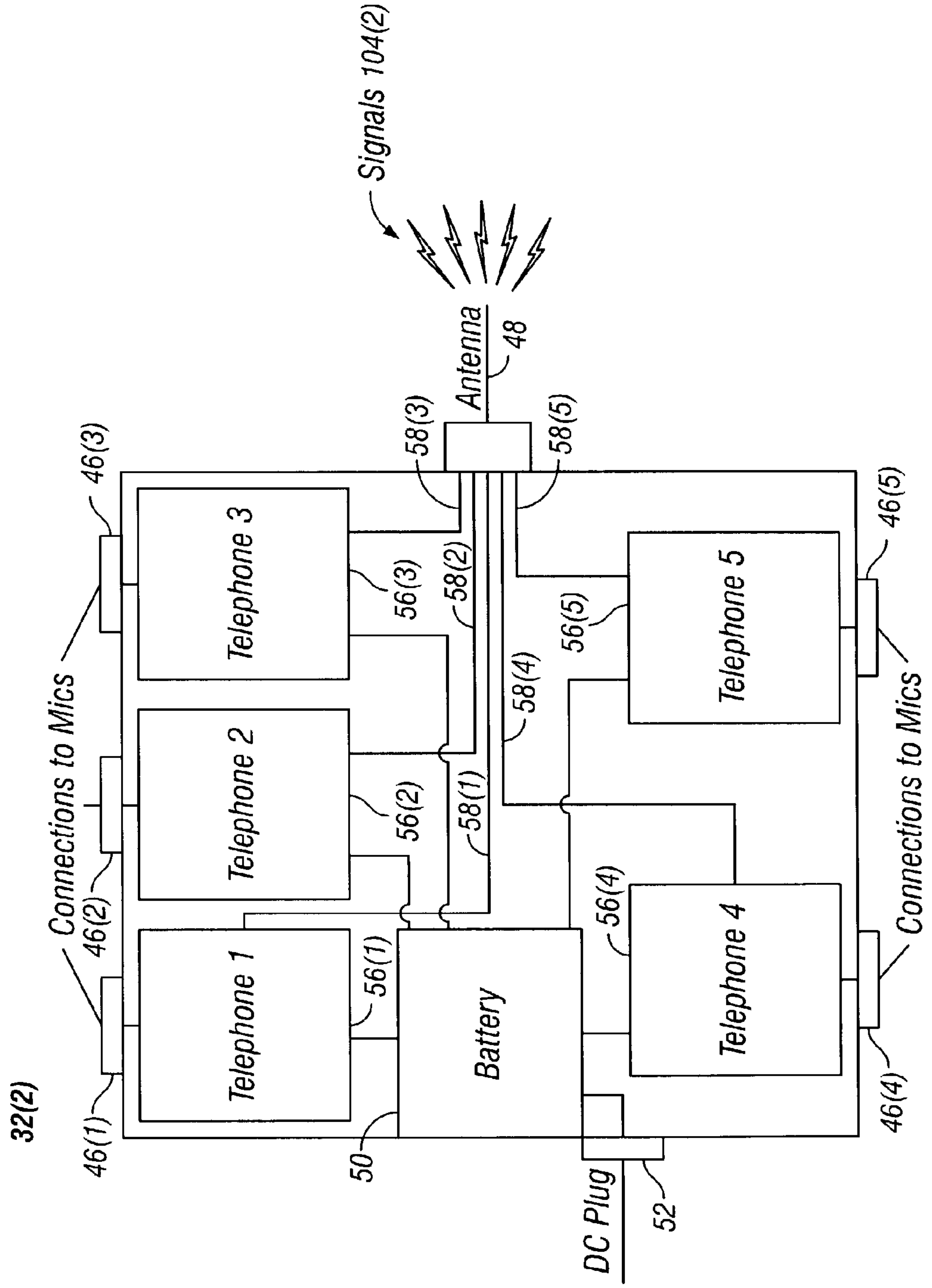
FIG. 6 is a schematic diagram of another transmission station having a plurality of telephones.
Figure 11:
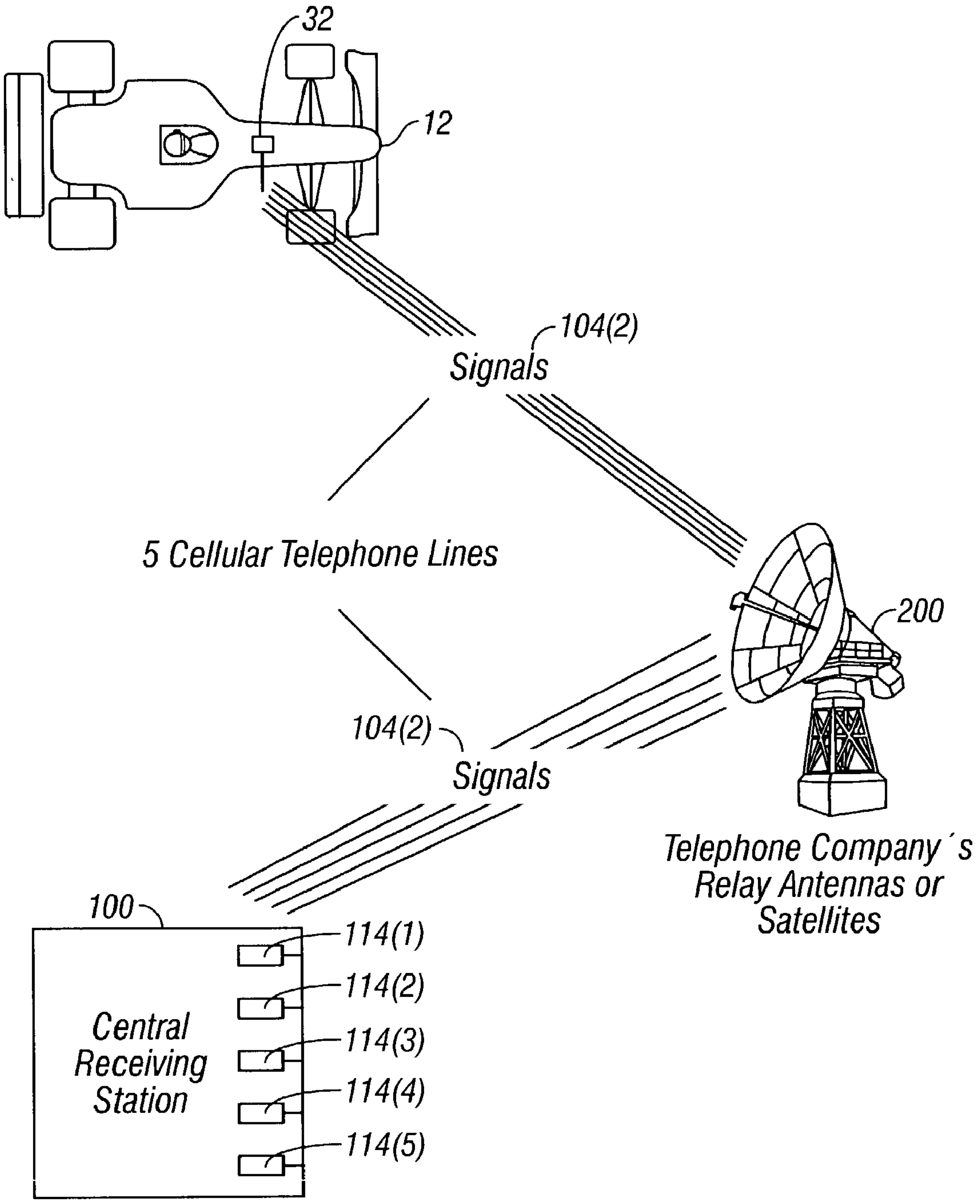
FIG. 11 shows a diagram of the system of FIG. 1 utilizing the transmission station of FIG. 6 coupled with relay antennas and one central receiving station.

Another configuration for a transmission station 32(2) is shown in FIG. 6. Transmission station 32(2) is similar to transmission station 32(1) and may have the same connectors 46(1)-46(5), antenna 48, battery 50, and DC plug 52, but instead of transmitters 44(1)-44(5) has telephones 56(1)-56(5), such as cellular telephones, to communicate signals 104(2) wirelessly to central receiving station 100. Telephones 56(1)-56(5) receive the five signals generated by microphone units 14(1)-14(5) and convert such signals into telephonic signals 58(1)-58(5). Telephones 56(1)-56(5) are in electrical communication with antenna 48 for transporting the telephonic signals 58(1)-58(5) thereto. Antenna 48 then relays wireless signals 104(2) (e.g., as cellular signals) based on telephonic signals 58(1)-58(5) over a telephone network 200 (e.g., relay antennas and/or satellites) to central receiving station 100, as seen in FIG. 11. Telephones 56(1)-56(5) are programmed to dial telephone numbers corresponding to five telephones 114(1)-114(5) located within central receiving station 100 to communicate signals 104(2) related to the sounds captured by units 14(1)-14(5) telephonically.

Figure 7:
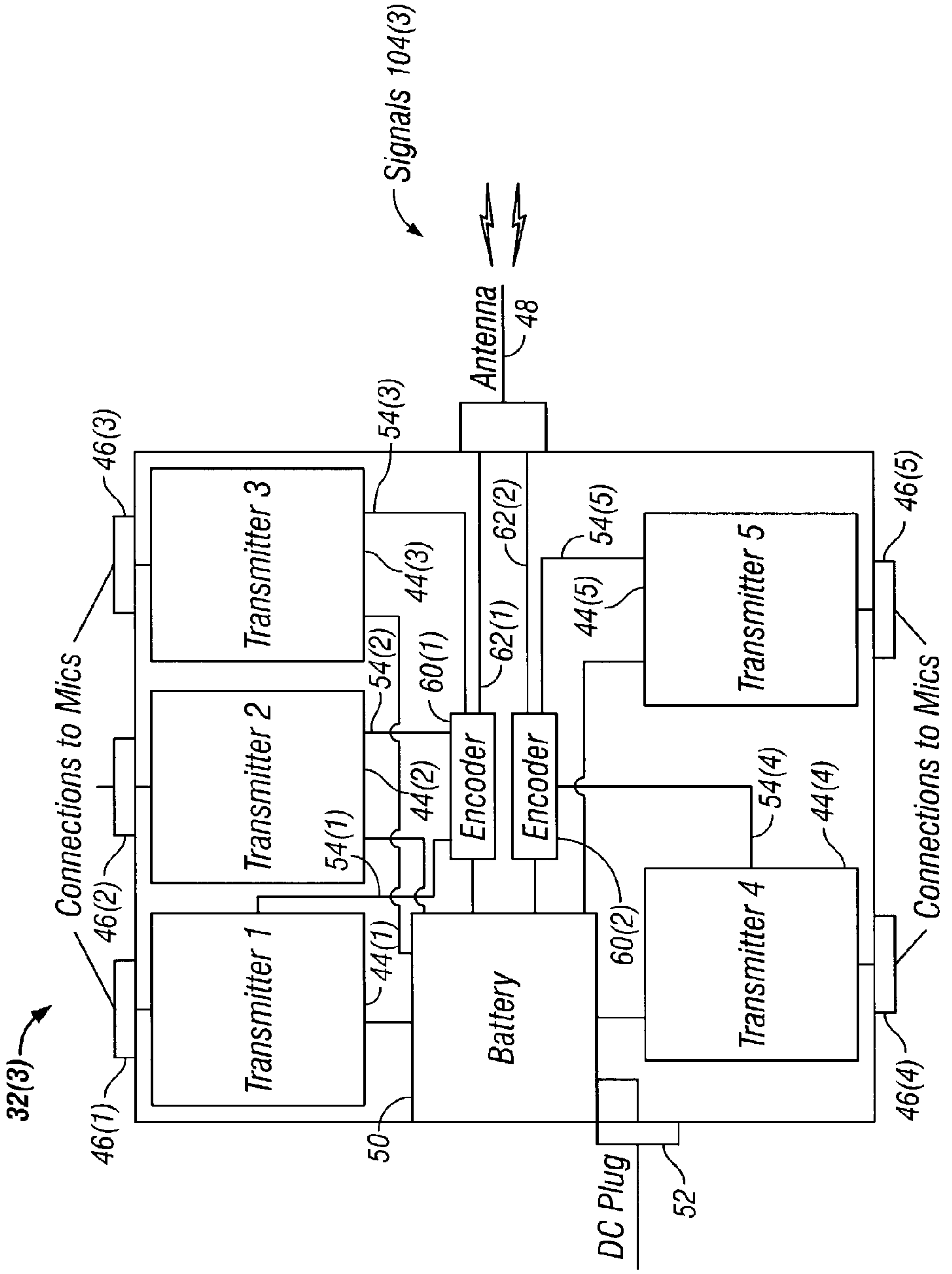
FIG. 7 is a schematic diagram of another transmission station having a plurality of transmitters and a pair of encoders.

FIG. 7 shows another representative transmission station 32(3). Transmission station 32(3) is likewise similar to transmission station 32(1) and may have the same transmitters 44(1)-44(5), connectors 46(1)-46(5), antenna 48, battery 50, and DC plug 52; but additionally, station 32(3) has a pair of encoders 60(1)-60(2). These encoders 60(1)-60(2) convert the output signals 54(1)-54(5) of transmitters 44(1)-44(5) to digitally encode signals, preferably into two digital streams 62(1)-62(2), for transmission as signals 104(3) through antenna 48 to central receiving station 100. The five signals 54(1)-54(5) of transmitters 44(1)-44(5) may be grouped into two pairs of signals, one pair having any three of signals 54(1)-54(5) and traveling to one encoder 60(1) and the other pair having the other two of signals 54(1)-54(5) and traveling to the other encoder 60(2). The digital streams 62(1)-62(2) may be decoded upon receipt by receiving station 100 back into signals 54(1)-54(5) for processing by station 100.

Figure 8:
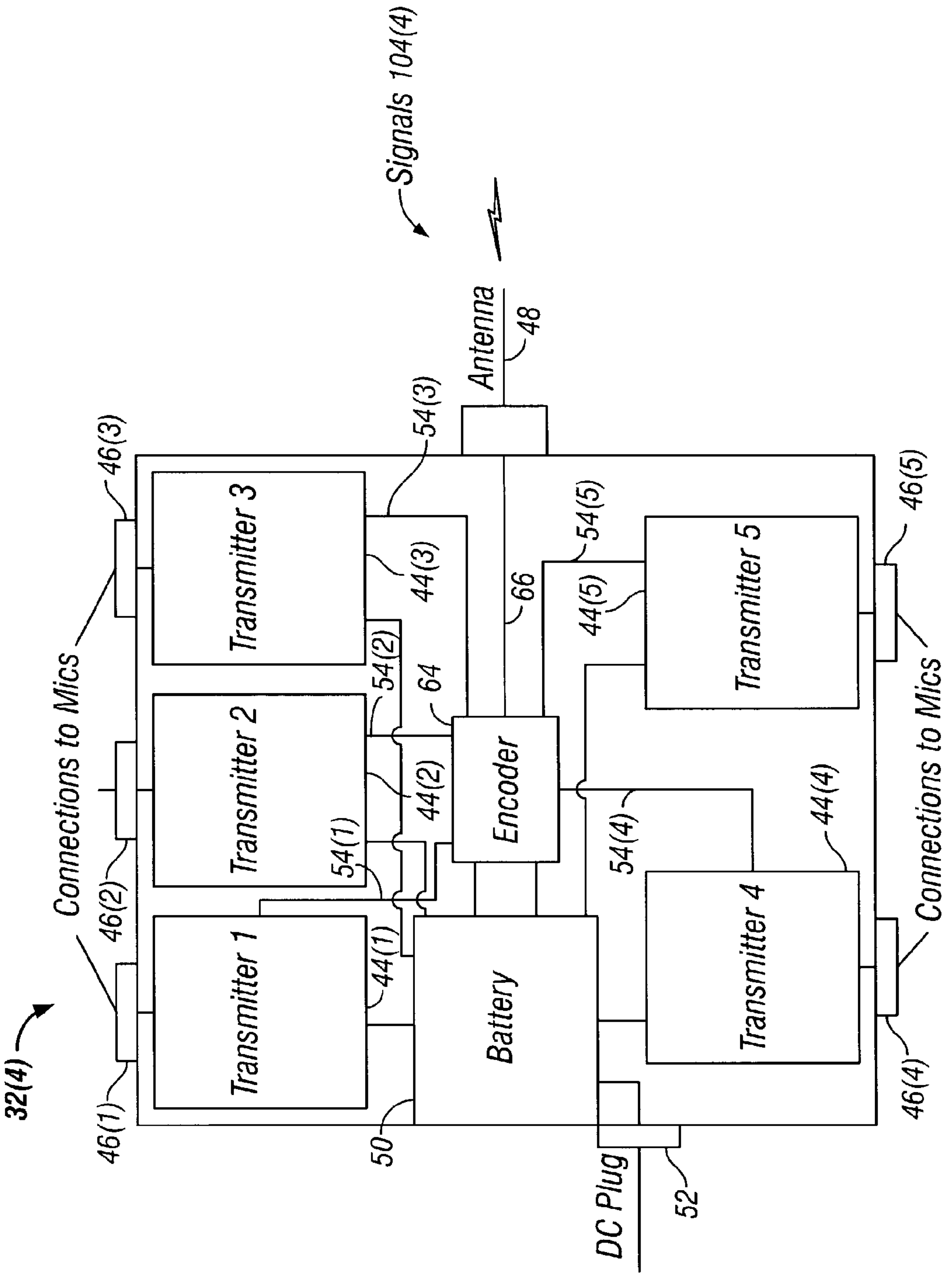
FIG. 8 is a schematic diagram of another transmission station having a plurality of transmitters and an encoder.

FIG. 8 presents a transmission station 32(4) similar to station 32(3), but instead merely has one encoder 64 for digitally encoding output signals 54(1)-54(5) of transmitters 44(1)-44(5). Encoder 64 converts signals 54(1)-54(5) into a single digitally encoded signal stream 66 for transmission through antenna 48 as signals 104(4) to central receiving station 100. The digital stream 66 may be decoded upon receipt by receiving station 100 back into signals 54(1)-54(5) for processing by station 100.

Figure 9:
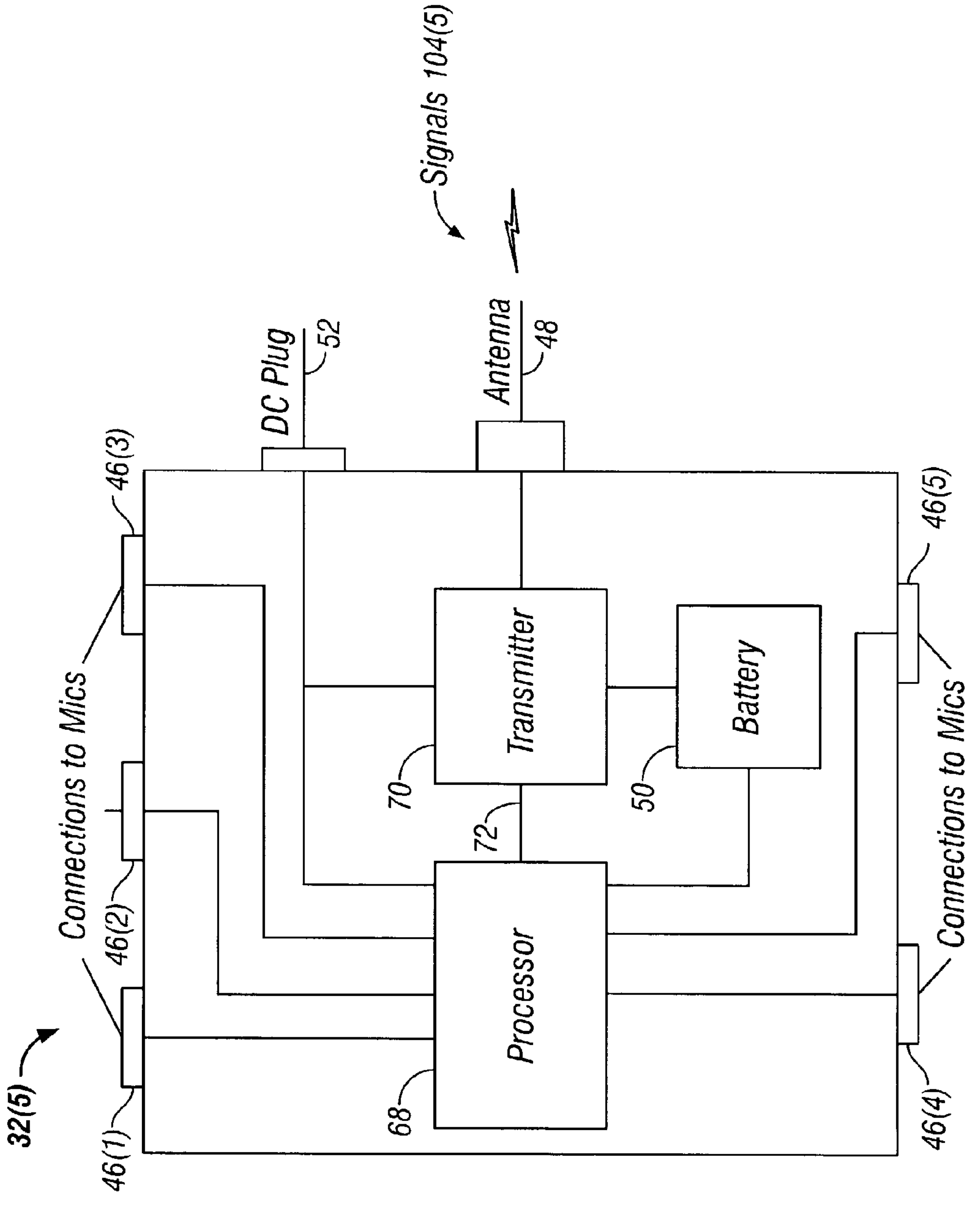
FIG. 9 is a schematic diagram of another transmission station having a processor and a transmitter.

FIG. 9 shows another representative transmission station 32(5). Transmission station 32(5) shares some components with transmission station 32(1), such as connectors 46(1)-46(5), antenna 48, battery 50, and DC plug 52; but additionally has a processor 68 and, preferably, a single transmitter 70. Battery 50 may provide electrical power to processor 68 and transmitter 70. Processor 68 has a microphone preamp for preamplifying the five output sound signals received from microphone units 14(1)-14(5), an A/D (analog/digital) converter for digitizing the sound signals, and a multi-encoder for encoding the digitized sound signals into a digital stream 72 communicated to transmitter 70. Transmitter 70 then transmits signals 104(5) through antenna 48 to central receiving station 100. The digital stream 72 may be decoded upon receipt by receiving station 100 back into the analog sound signals generated by microphone units 14(1)-14(5) for processing by station 100.

Figure 10:
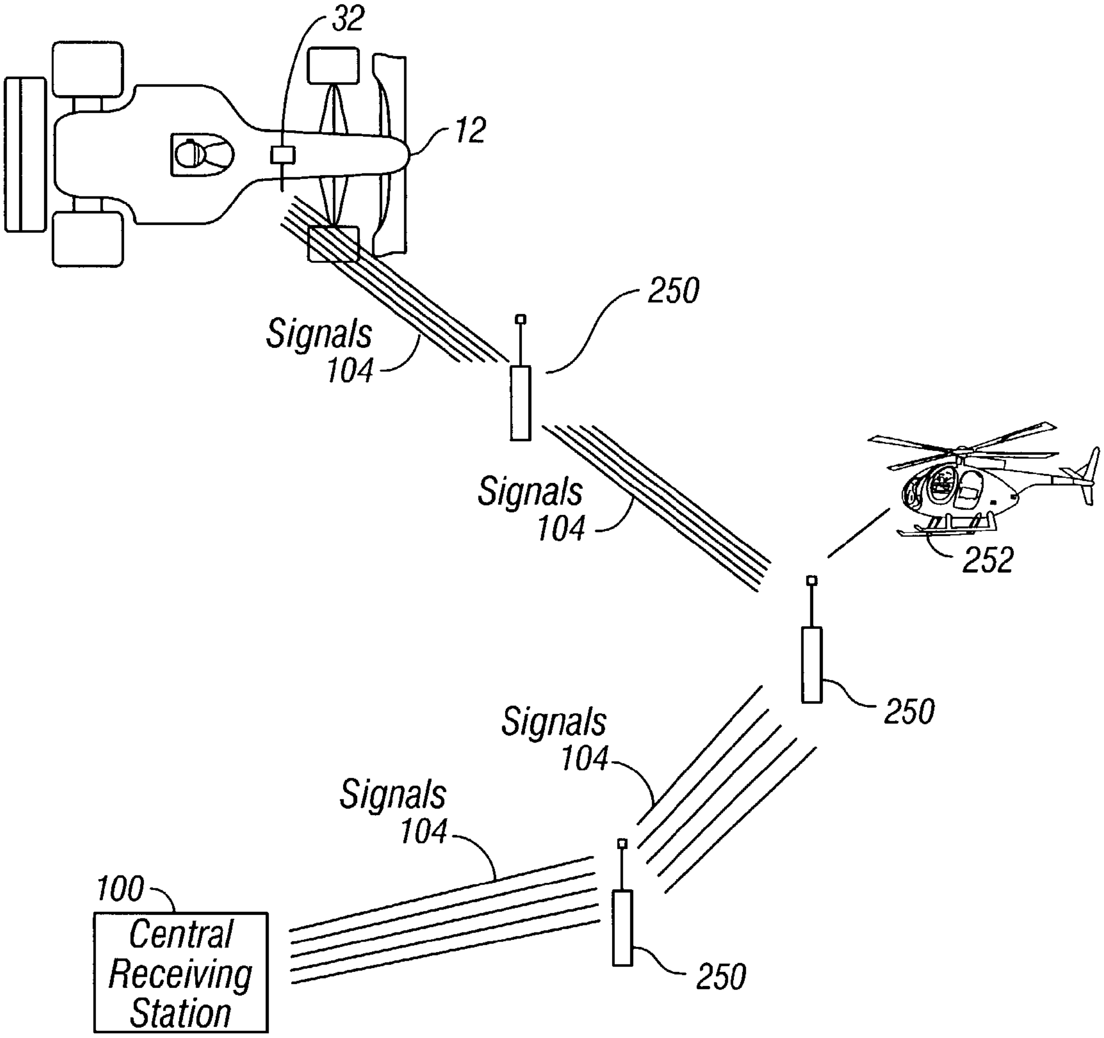
FIG. 10 shows a diagram of the system of FIG. 1 coupled with relay antennas and one central receiving station.

As seen in FIG. 10, it should also be understood that one or more relay antennas 250 may be provided to boost the amplification of any of the output signals 104 traveling from transmission stations 32(1)-32(5) to central receiving station 100 to reduce loss of signal continuity. Relay antennas 250 may be ground-based, or positioned on a moving object such as a helicopter 252 or other aircraft.

Figure 12:
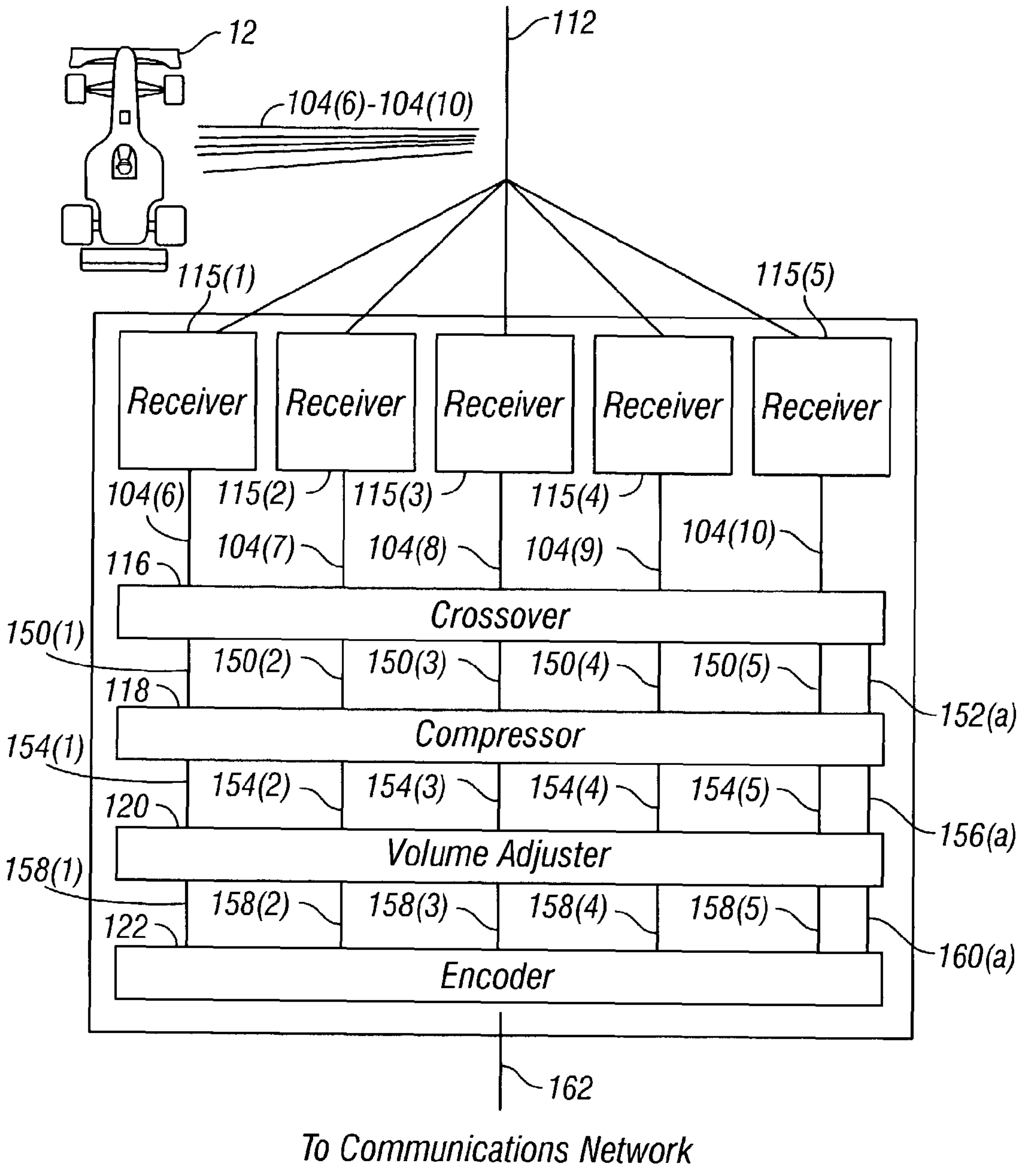
FIG. 12 is a schematic diagram of one central receiving station.
Figure 13:
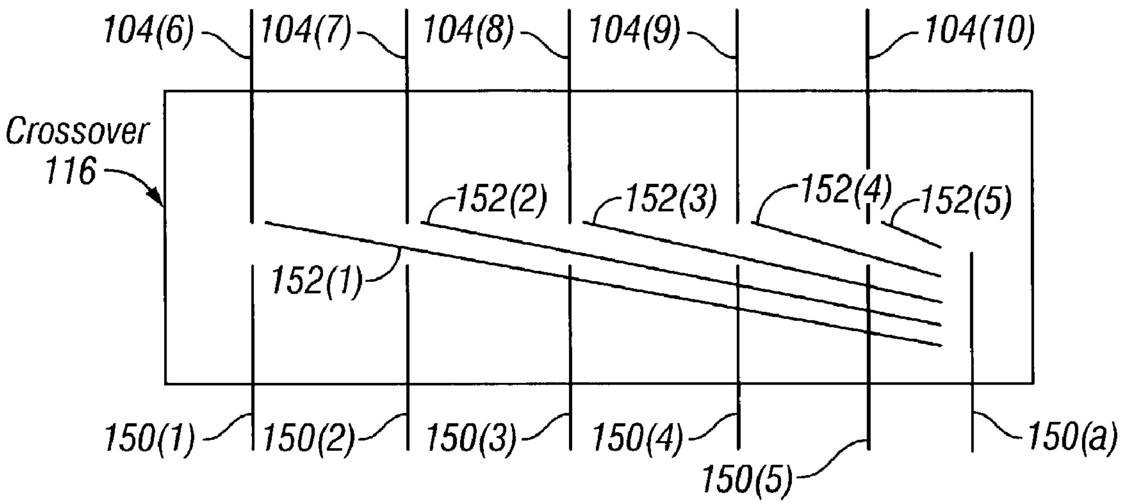
FIG. 13 is a schematic diagram of signals handled by a crossover of the central receiving station of FIG. 12.
Figure 14:
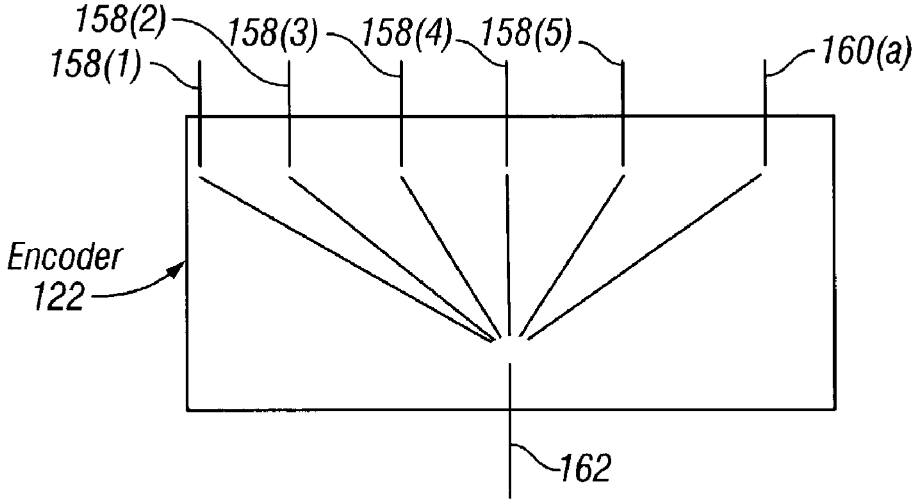
FIG. 14 is a schematic diagram of signals handled by an encoder of the central receiving station of FIG. 12.

FIG. 12 schematically shows the components of central receiving station 100 for readying signals to be sent over network 102 for broadcasting to an audience. Wireless signals 104 are received from the transmission stations by antenna 112 and communicated to receivers 115. For example, if transmission station 32(1) is implemented, then five receivers 115(1)-115(5) will be provided for receiving the five RF signals 104(6)-104(10) regarding sounds captured by microphone units 14(1)14(5). Receiving station 100 may also have a crossover 116, a compressor 118, a volume adjustor 120, and an encoder 122. FIG. 13 shows the details of the signals handled by crossover 116. Signals 104(6)-104(10) are divided by crossover 116 into high frequency signals 150(1)-150(5) and low frequency signals 152(1)-152(5). Low frequency signals 152(1)-152(5) are merged into a sub-signal **150*a*. High frequency signals 150(1)-150(5) then proceed along with sub-signal 150*a* to compressor 118. Signals 150(1)-150(5) and 150*a* from crossover 116 are compressed in compressor 118 in order to optimize the signal ratio and minimize noise in the signals, thus forming compressed high frequency signals 154(1)-154(5) and sub-signal 156*a*. These signals then travel to volume adjustor 120, where volumes for each of signals 154(1)-154(5) and 156*a* may be set individually according to the application. For example, the signal representing sounds captured by the omni-directional microphone unit 14(5) may be given a higher volume than the other signals such that the audience can better hear what driver 26 is hearing. The volume adjustment generates high frequency signals 158(1)-158(5) and sub-signal 160*a* which travel to encoder 122. FIG. 14 shows encoder 122 merging signals 158(1)-158(5) and 160*a* into a new digital signal 162 ready for broadcasting over communications network 102, such as a television network. Signal 162 represents both the high and low frequency sounds captured by microphone units 14(1)-14(5) and processed by receiving station 100. Additionally, because of the processing that takes place in central receiving station 100, a variety of parameters may be preset in station 100** such that a desired combination of settings (i.e., output sound characteristics for broadcasting) may be reproduced as sound signals vary.

Since certain changes may be made in the above methods and systems without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A method for determining surround sound from a moving object, comprising the steps of:

coupling a plurality of first microphone units with the moving object to capture sounds from around the object, wherein coupling includes arranging the plurality of first microphone units such that one or more of the first microphone units captures sound in a direction perpendicular to forward movement of the moving object;

coupling a second, omni-directional microphone unit to a subjective location of the moving object, to omni-directionally capture sound around the subjective location; transmitting signals indicative of the captured sounds to a central receiving station; processing the signals together at the central receiving station, wherein processing comprises:

dividing the signals into high frequency signals and low frequency signals;

compressing the high and low frequency signals; and adjusting volume for the high and low frequency signals; and transmitting processed information, from the central receiving station, to a communications network, for replaying the surround sound from the moving object to an audience.

2. A method of claim 1, the communications network comprising a television network.

3. A method of claim 1, the step of transmitting signals further comprising wirelessly relaying the signal indicative of captured sounds from the microphone units to at least one transmitter.

4. A method of claim 1, the step of coupling comprising coupling each of the microphone units within a recessed area of the moving object, to reduce wind resistance noises generated by the units.

5. A method of claim 1, further comprising the steps of coupling an omni-directional microphone unit to a subjective location with the moving object and transmitting signals comprising transmitting an omni signal indicative of omni-directional sounds at the omni-directional microphone unit and to the central receiving station, the step of transmitting further comprising transmitting information, from the central receiving station, to the network for replaying the sounds, including the omni-directional sounds.

6. A method of claim 5, the step of coupling an omni-directional microphone comprising attaching the omni-directional microphone near to an ear of a person with the moving object.

7. A method of claim 6, the step of attaching comprising attaching the omni-directional microphone to a helmet of a race car driver.

8. A method of claim 1, the step of coupling the plurality of first microphone units comprising attaching at least four microphone units to extremities of the moving object.

9. A method of claim 8, the step of coupling the plurality of first microphone units comprising attaching the units to four extremities of a racing car.

10. A method of claim 1, further comprising capturing images from a camera with the moving object.

11. A method of claim 10, further comprising relaying the images to the network for replaying of the images to the audience.

12. A method of claim 1, further comprising one of mixing, compressing, and encoding, by the central receiving station, signals transmitted to the central receiving station.

13. The method of claim 1, wherein processing further comprises combining signals indicative of all captured sounds to create a single surround sound signal.

14. A system for capturing and reporting surround sound of a moving object to an audience, comprising:

a plurality of first microphone units for capturing sounds from around the moving object, the plurality of first microphone units arranged such that one or more of the first microphone units captures sound in a direction perpendicular to forward movement of the moving object;

a second, omni-directional microphone unit positioned with a subjective location, for omni-directionally capturing sound from the subjective location;

a transmission unit communicatively coupled to the first and second microphone units for transmitting information indicative of the sounds as wireless signals; and a central receiving station, apart from the transmission unit, for capturing the wireless signals and relaying information about the signals; a processing unit with the central receiving station, for processing together the wireless signals to:

divide the signals into high and low frequency signals, compress the high and low frequency signals, and adjust volume of the high and low frequency signals; and a television network, the television network receiving the processed signals and the information about the signals and broadcasting the surround sound of the moving object to a television viewing audience.

15. A system of claim 14, the transmission unit comprising a plurality of transmitters connected to an antenna.

16. A system of claim 15, each of the plurality of transmitters transmitting a wireless signal indicative of the sound captured by one of the plurality of first microphone units or the second microphone unit.

17. A system of claim 16, the plurality of transmitters configured for generating radio frequency wireless signals.

18. A system of claim 14, the transmission unit comprising:

a plurality of transmitters;

at least one encoder connected with the plurality of transmitters for encoding the information indicative of the sounds as at least one digital signal to be wirelessly transmitted; and an antenna connected with the at least one encoder; wherein the central receiving station has a means for decoding the at least one digital wireless signal received from the transmission unit.

19. A system of claim 18, the at least one encoder comprising two encoders.

20. A system of claim 14, the transmission unit comprising a plurality of cellular telephones connected to an antenna, the wireless signals being generated by the telephones as wireless telephone frequency signals and routed to the central receiving station through a telephone relay network.

21. A system of claim 14, further comprising at least one relay antenna for receiving the wireless signals from the transmission unit and retransmitting the signals to the central receiving station.

22. A system of claim 14, the moving object comprising a racecar, the plurality of microphone units configured for positioning within a plurality of recessed areas of the racing car for reducing wind resistance sound and to enhance directional listening of the units.

23. A system of claim 22, each of the microphone units comprising a directional microphone, the plurality of units being constructed and arranged with the moving object to capture sound perpendicular to forward movement of the moving object.

24. A system of claim 14, further comprising an omni-directional microphone unit for capturing omni-directional sounds of the moving object, wherein the transmission unit being communicatively coupled to the omni-directional microphone unit for transmitting transmits information indicative of the omni-directional sounds from the second, omni-directional microphone unit with the wireless signals.

25. A system of claim 24, the second, omni-directional microphone unit comprising an omni-directional microphone adjacent to an ear of a person with the moving object.

26. A system of claim 25, the person comprising a racecar driver.

27. A system of claim 14, the moving object comprising a racecar.

28. A system of claim 14, the central receiving station comprising means for one or more of mixing the wireless signals, compressing the wireless signals, and encoding the wireless signals.

29. A system of claim 14, the transmission unit comprising:

a processor configured to preamplify sound signals received from the plurality of microphone units, digitize the sound signals, and encode the sound signals to generate a digital signal stream;

a transmitter receiving the digital signal stream; and an antenna connected with the transmitter to wireless communicate the digital signal stream.

30. A sound capturing and relaying system for a racecar, comprising:

a racecar having a cockpit for a driver of the car;

a plurality of first microphone units for capturing sounds of the racecar, each first microphone unit being mounted within a recessed area formed in the racecar, the recessed areas located distal to the cockpit; wherein the plurality of first microphone units is arranged such that one or more of the first microphone units captures sound in a direction perpendicular to forward movement of the moving object; a second microphone unit located proximal to at least one of the cockpit and a centerpoint of the racecar; at least one transmission unit mounted to the racecar and communicatively coupled to the plurality of first microphone units and the second microphone unit for transmitting information indicative of the captured sounds from the plurality of first microphone units and the second microphone unit as wireless signals; and a central receiving station and a communications network, the central receiving station capturing the wireless signals, processing the signals together, and relaying information about the signals to the communications network, the network broadcasting the surround sound of the racecar to an audience, wherein processing the signals comprises:

dividing the signals into high frequency signals and low frequency signals;

compressing the high and low frequency signals; and adjusting volume for the high and low frequency signals.

* * * * *

UNITED STATES PATENT AND TRADEMARK OFFICE

CERTIFICATE OF CORRECTION

PATENT NO. : 7,835,530 B2
APPLICATION NO. : 10/301166
DATED : November 16, 2010
INVENTOR(S) : Avigni It is certified that error appears in the above-identified patent and that said Letters Patent is hereby corrected as shown below:

Column 1, line 16, “from that the” should read --from the--; line 32; “others and” should read --others--; line 63 “comer” should read --corner--;
Column 2, line 22, “race car” should read --racecar--;
Column 3, line 43, “tures omni-directional” should read --ture omni-directional--;
Column 4, line 33, “castings” should read --casting--; line 66, “with helmet” should read -- within helmet--;
Column 6, line 45, “14(1)14(5)” should read --14(1)-14(5)--;
Column 7, line 13, “drawing” should read --drawings--; line 54, “with the” should read --within the--; line 63, “with the” should read --within the--; line 67, “race car” should read --racecar--;
Column 8, line 8, “with the” should read --within the--; line 26 “with a” should read --within a--; line 33, “with the” should read --within the--;
Column 9, line 12, “with the” should read --within the--; line 24, “with the” should read --within the--;
Column 10, line 4, “wireless” should read --wirelessly--;

Signed and Sealed this
Fifteenth Day of February, 2011

David J. Kappos

*Director of the United States Patent and Trademark Office*